(12) United States Patent
Staiano et al.

(10) Patent No.: US 10,617,259 B2
(45) Date of Patent: Apr. 14, 2020

(54) HERB GRINDER SYSTEM

(71) Applicant: Volo Trade, Inc., Miami, FL (US)

(72) Inventors: Mark Staiano, Miami, FL (US); Dan Talbot, Montreal (CA)

(73) Assignee: Volo Trade, Inc., Athens, GA (US)

( * ) Notice: Subject to any disclaimer, the term of this patent is extended or adjusted under 35 U.S.C. 154(b) by 0 days.

(21) Appl. No.: 16/054,193

(22) Filed: Aug. 3, 2018

(65) Prior Publication Data

US 2018/0338642 A1 Nov. 29, 2018

Related U.S. Application Data

(63) Continuation of application No. 14/857,447, filed on Sep. 17, 2015, now Pat. No. 10,039,418.

(60) Provisional application No. 62/051,404, filed on Sep. 17, 2014.

(51) Int. Cl.
| | |
|---|---|
| *B02C 18/00* | (2006.01) |
| *A47J 42/34* | (2006.01) |
| *B02C 18/08* | (2006.01) |
| *B02C 23/10* | (2006.01) |
| *A47J 42/00* | (2006.01) |

(52) U.S. Cl.
CPC .............. *A47J 42/34* (2013.01); *A47J 42/00* (2013.01); *B02C 18/08* (2013.01); *B02C 23/10* (2013.01)

(58) Field of Classification Search
CPC ........... A47J 42/34; A47J 42/00; B02C 18/08; B02C 23/10

USPC .......................................... 241/169.1, 273.1
See application file for complete search history.

(56) References Cited

U.S. PATENT DOCUMENTS

| | | | |
|---|---|---|---|
| 4,081,145 | A | 3/1978 | Moe et al. |
| 4,280,666 | A | 7/1981 | Jones |
| 4,856,718 | A | 8/1989 | Gaber et al. |
| 6,082,648 | A | 7/2000 | Marriere et al. |
| 7,367,519 | B2 | 5/2008 | de Groote et al. |
| 7,422,170 | B2 | 9/2008 | Bao |
| 8,083,167 | B1 | 12/2011 | Namakian et al. |
| 8,677,895 | B2 | 3/2014 | Beber et al. |
| 8,733,679 | B2 | 5/2014 | Camitta |
| 9,427,020 | B2 | 8/2016 | Ruzycky |
| 9,510,709 | B2 | 12/2016 | Wilson et al. |
| 2009/0212142 | A1 | 8/2009 | Greiner |
| 2012/0097774 | A1 | 4/2012 | Hainbach |
| 2013/0193246 | A1 | 8/2013 | Roberts, Jr. |
| 2013/0263716 | A1 | 10/2013 | Rouyer et al. |

(Continued)

*Primary Examiner* — Faye Francis
(74) *Attorney, Agent, or Firm* — McHale & Slavin, P.A.

(57) ABSTRACT

The present invention involves a system and method for grinding herbs, tobacco, marijuana and the like. The herb grinder system herein includes interchangeable and replaceable lower grinder plates that are secured in place with threading, bayonet mounts or the like. The upper and lower grinding plates are provided with blades having a modified diamond shape which provides extremely sharp leading edges regardless of which direction the grip assembly of the grinder housing is rotated. The lower plates are also provided with variations in the size, shape and arrangement of hole sizes through which the ground material is allowed to pass through. This construction provides the user with the ability to control his/her grind size mixture, which may be consistent sized grinds or a mixture of different sized grinds.

10 Claims, 10 Drawing Sheets

(56) References Cited

U.S. PATENT DOCUMENTS

2014/0217213 A1 8/2014 Edwards et al.
2017/0135524 A1* 5/2017 Moneta .................. A47J 42/24

* cited by examiner

HERB GRINDER SYSTEM

PRIORITY CLAIM

In accordance with 37 C.F.R. 1.76, a claim of priority is included in an Application Data Sheet filed concurrently herewith. Accordingly, the present invention claims priority as a continuation application to U.S. patent application Ser. No. 14/857,447, entitled "Herb Grinder System", filed Sep. 17, 2015, now U.S. Pat. No. 10,039,418, issued Aug. 7, 2018, which claims priority to U.S. Provisional Patent Application No. 62/051,404, entitled "Grinder for Tobacco, Herbs and the Like", filed Sep. 17, 2014; the contents of which the above referenced application is incorporated herein by reference.

BACKGROUND AND SUMMARY

In general, tobacco and botanical herb grinders are cylindrical devices divided into two halves with sharp pegs or teeth aligned such that when the halves are rotated with respect to each other, the material inside is shredded. Herb grinders are made from wood, plastic or metal, and may be manual or electric. They are commonly used for refining marijuana or tobacco, as well as in the kitchen for crushing spices and herbs.

A grinder of background interest is shown in U.S. Pat. No. 7,422,170. In this device the grinder plates are secured by friction to the rotatable halves of the grinder to make manufacturing of the device easier. However, the friction securement between the components often allows the grinding plates to spin within the housing, binding the rotation of the device, thus reducing the volume of material ground and the ability of the operator to control the grind and the grind size. In addition, the device of the 170' patent fails to provide for the storage of additional grinding plates, screens, herbs or the like.

Finally, there are ergonomic needs that an herb grinder system must satisfy in order to achieve acceptance by the end user. The system must be easily and quickly assembled using minimal hardware and requiring a minimal number of tools. Further, the herb grinder system should not require excessive strength to assemble or include cumbersome and difficult to use component parts. Moreover, the system must assemble together in such a way so as not to detract from the aesthetic appearance of the herb grinder system.

Thus, the present invention provides an herb grinder system which overcomes the disadvantages of prior art grinder devices. The herb grinder system of the present invention not only provides for relative ease in assembly and use, it also permits alteration of the grinding system without the need to carry additional system components separately from the grinder. The present invention also provides a storage area for herbs or the like, thereby eliminating the need for transporting additional storage devices.

SUMMARY OF THE INVENTION

Briefly, the present invention involves a system and method for grinding herbs, tobacco, marijuana and the like. The herb grinder system herein includes interchangeable and replaceable lower grinder plates that are secured in place with threading, bayonet mounts or the like. The upper and lower grinding plates are provided with blades having a modified diamond shape which provides extremely sharp leading edges regardless of which direction the grip assembly of the grinder housing is rotated. The lower plates are also provided with variations in the size, shape and arrangement of hole sizes through which the ground material is allowed to pass through. This construction provides the user with the ability to control his/her grind size mixture, which may be consistently sized grinds or a mixture of different sized grinds. The upper grinding plate is provided as an integral portion of the grip assembly. The grip assembly is provided with a pilot shoulder having rings that cooperate with an internal diameter of the grinder housing to locate the upper grinding plate within the housing, causing the blades to properly align. Troughs positioned between the rings provide space for particles, resins, gums and the like, which prevent the grip assembly from binding in the housing. The grip assembly is comprised of a lower portion and an upper portion. The upper portion includes a lid member having internal threads for engaging the lower portion. In this manner, the lid functions to store additional lower grinding plates as well as herbs, tobacco or the like. A lower portion of the housing is also threaded to cooperate with a removable and replaceable screen, which allows cleaning or interchangeability with screens of different mesh. These features give the user greater ability to select and customize the grinding of their tobacco and botanical herbs.

Accordingly, it is an objective of the present invention to provide an herb grinding system.

It is a further objective of the present invention to provide an herb grinding system that includes at least one removable and replaceable grinding plate.

It is yet a further objective of the present invention to provide a grinding plate that includes a positive interlocking engagement to the grinder housing.

It is another objective of the instant invention to provide an herb grinding system that includes a removable and replaceable screen for separation of trichomes from ground herbs.

Still yet another objective of the present invention is to provide an herb grinding system that provides for sealed storage of ground herbs and the like within the upper grinding assembly.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

In this description, references to "top", "bottom", "upper", "lower", and the like merely refer to the relative positions of the elements and parts of the grinder in the figures, and do not restrict the positioning of the elements and parts in actual use.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 1:
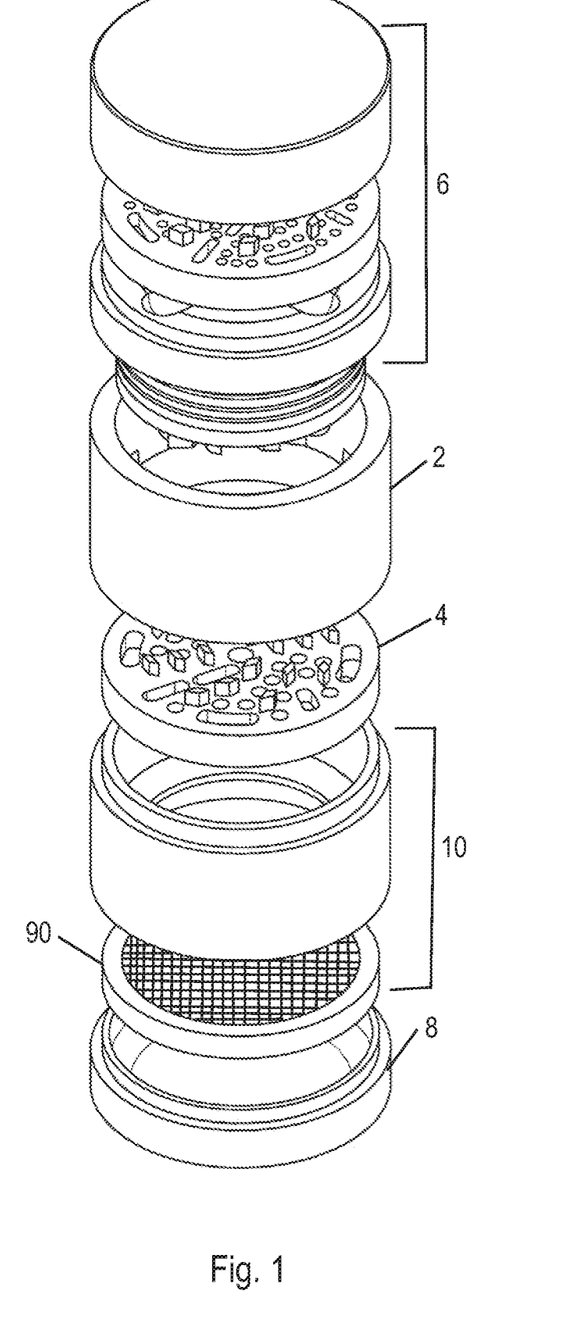
FIG. 1 is an exploded isometric view illustrating one embodiment of an herb grinder system.
Figure 2:
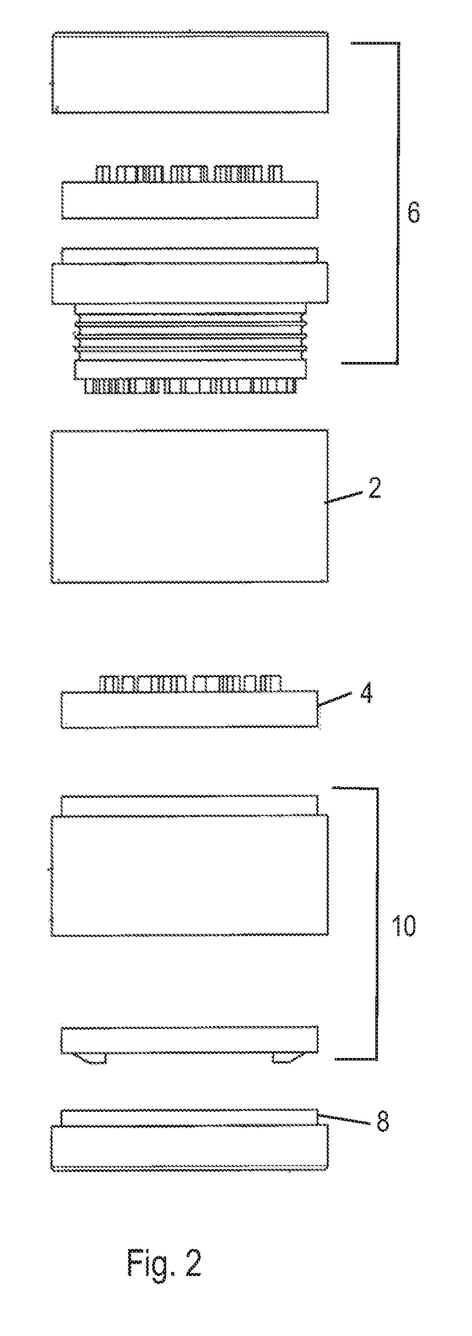
FIG. 2 is an exploded plan view of the herb grinder system illustrated in FIG. 1.
Figure 3A:
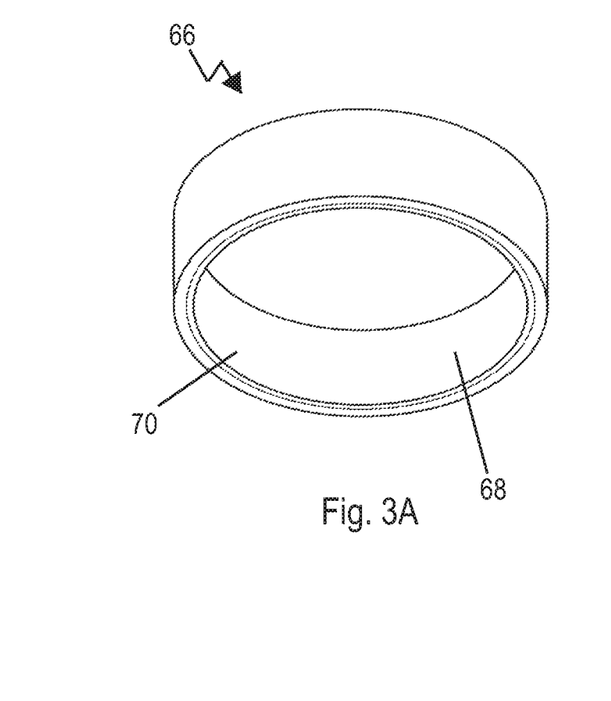
FIG. 3A is an isometric view illustrating the lid member of the embodiment illustrated in FIG. 1.
Figure 3B:
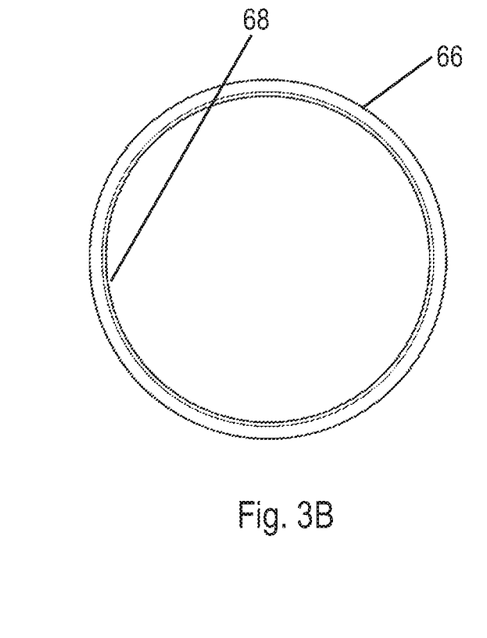
FIG. 3B is a plan view illustrating the bottom side of the lid member.
Figure 3C:
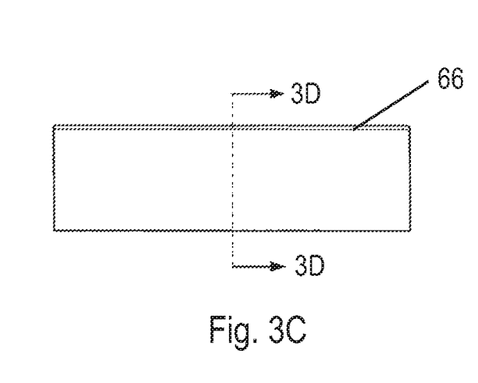
FIG. 3C is a plan view illustrating the side of the lid member.
Figure 3D:
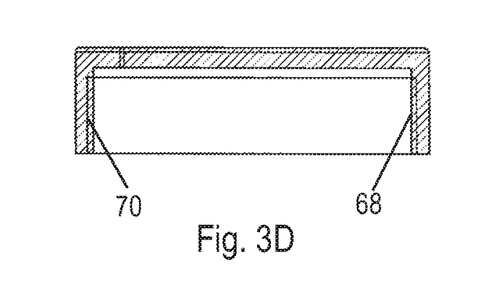
FIG. 3D is a section view taken along lines 3D-3D of FIG. 3C.
Figure 4A:
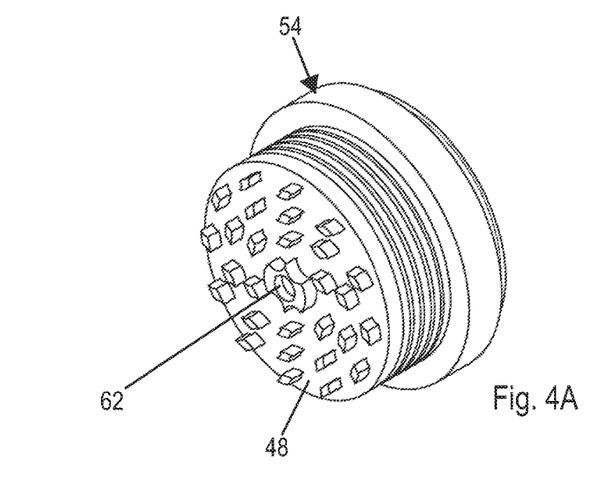
FIG. 4A is an isometric view illustrating the upper grinding plate of the embodiment illustrated in FIG. 1.
Figure 4B:
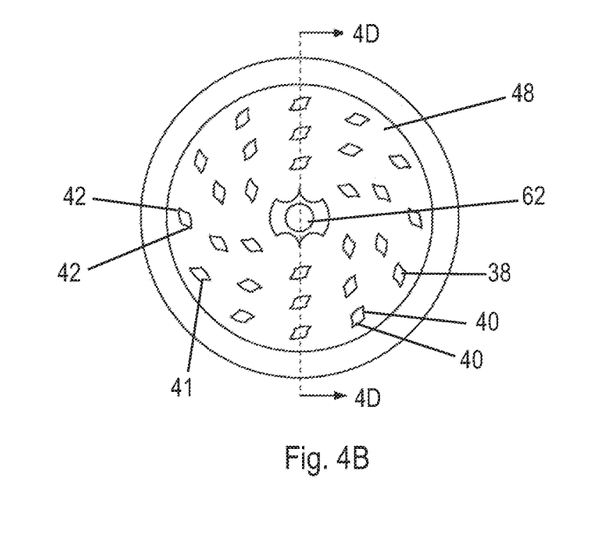
FIG. 4B is a plan view illustrating the bottom side of the upper grinding plate.
Figure 4C:
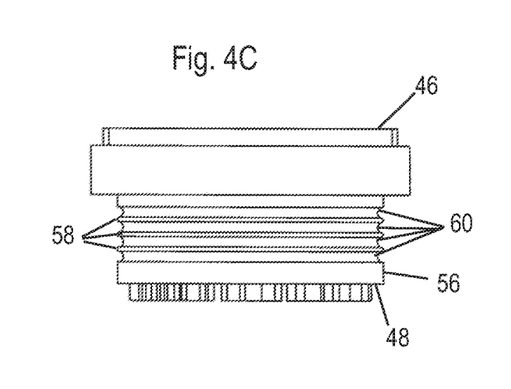
FIG. 4C is a plan view illustrating the side of the upper grinding plate.
Figure 4D:
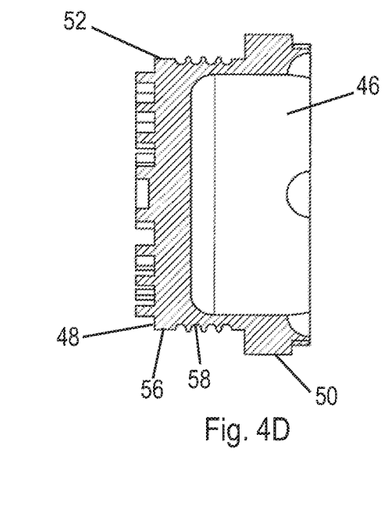
FIG. 4D is a section view taken along lines 4D-4D of FIG. 4B.
Figure 5A:
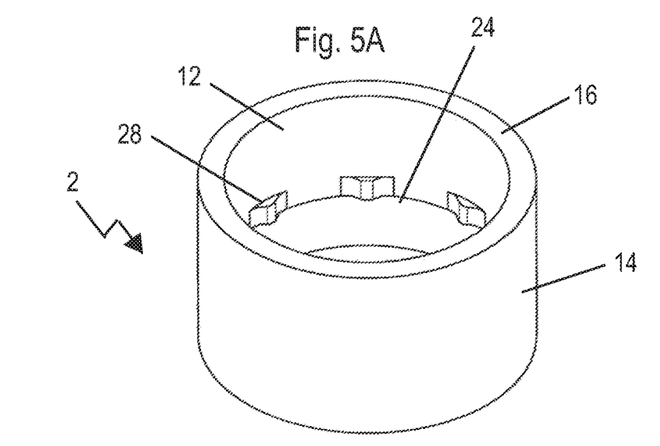
FIG. 5A is an isometric view illustrating the tubular housing member of the embodiment illustrated in FIG. 1.
Figure 5B:
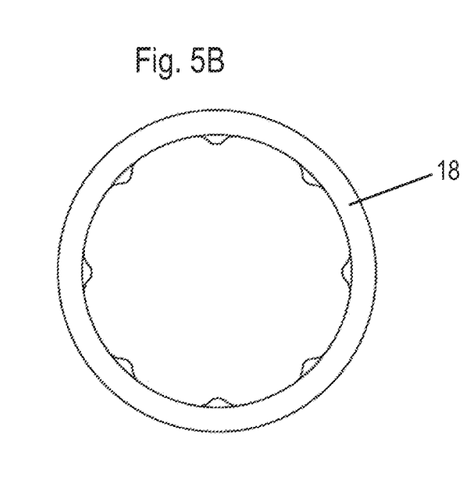
FIG. 5B is a plan view illustrating the bottom side of the tubular housing member.
Figure 5C:
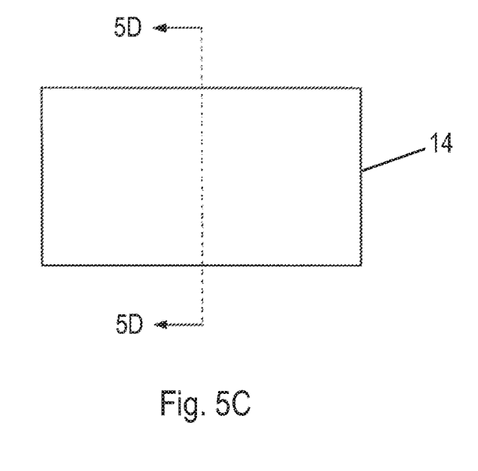
FIG. 5C is a plan view illustrating the side of the upper tubular housing member.
Figure 5D:
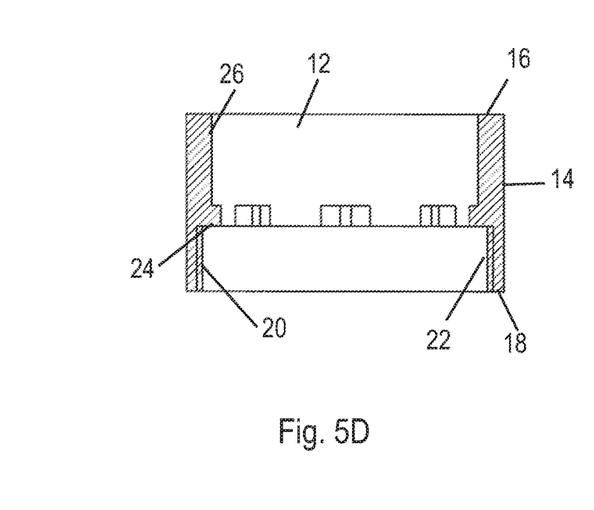
FIG. 5D is a section view taken along lines 5D-5D of FIG. 5C.
Figure 6A:
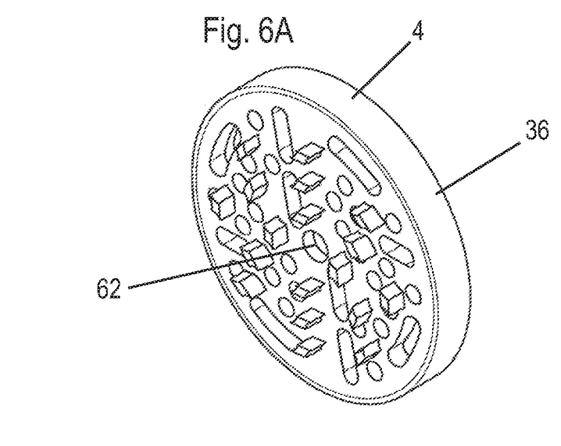
FIG. 6A is an isometric view illustrating the first lower grinding plate of the embodiment illustrated in FIG. 1.
Figure 6B:
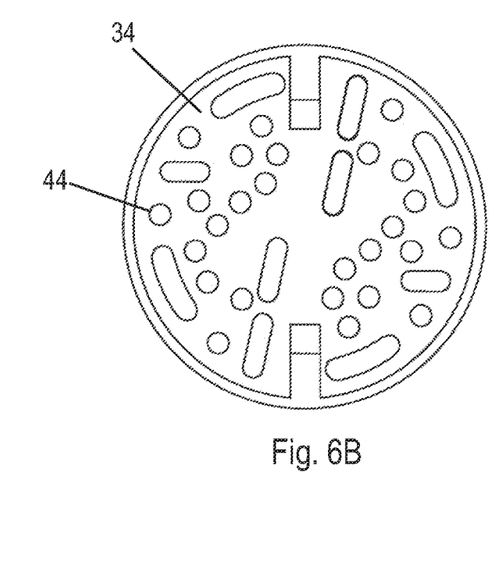
FIG. 6B is a plan view illustrating the bottom side of the first lower grinding plate.
Figure 6C:
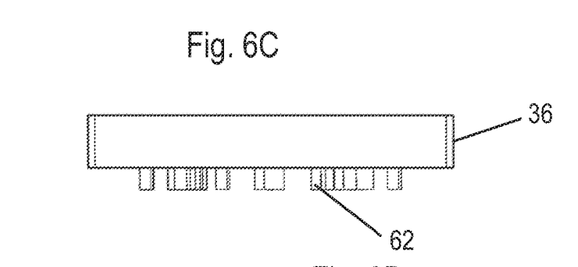
FIG. 6C is a plan view illustrating the side of the first lower grinding plate.
Figure 6D:
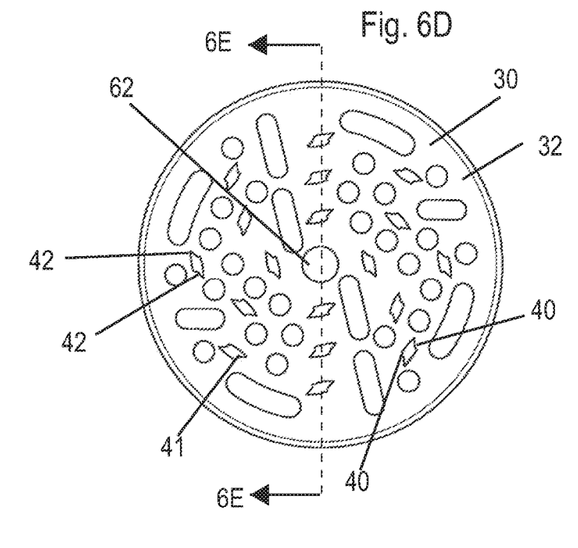
FIG. 6D illustrates the top side of the first lower grinding plate.
Figure 6E:
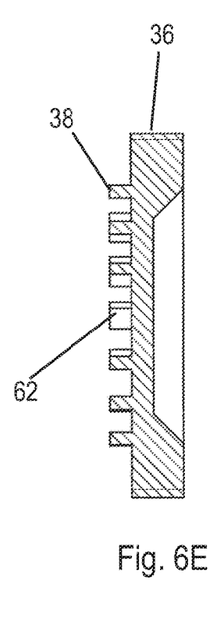
FIG. 6E is a section view taken along lines 6E-6E of FIG. 6D.
Figure 7A:
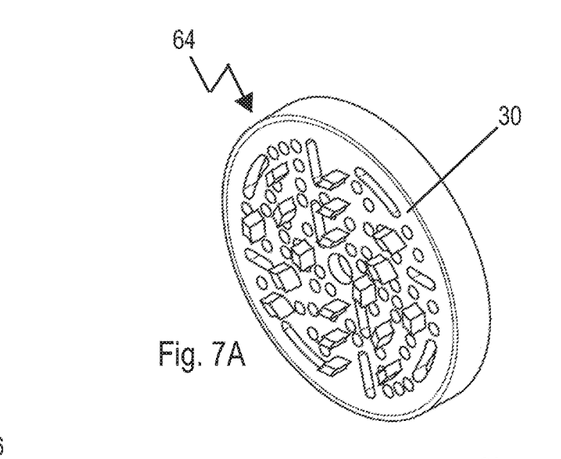
FIG. 7A is an isometric view illustrating the second lower grinding plate of the embodiment illustrated in FIG. 1.
Figure 7B:
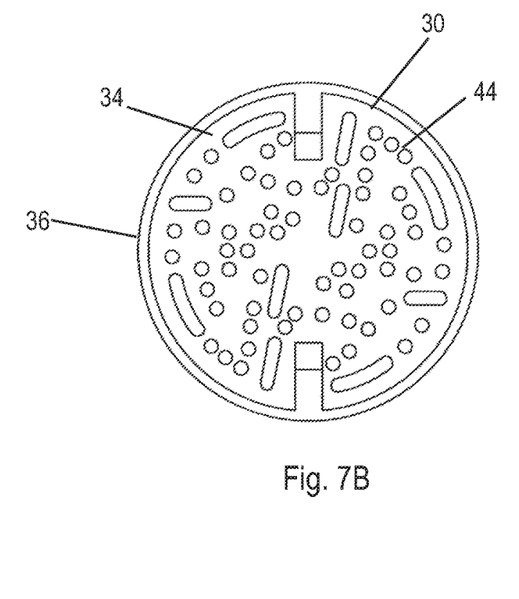
FIG. 7B is a plan view illustrating the bottom side of the second lower grinding plate.
Figure 7C:
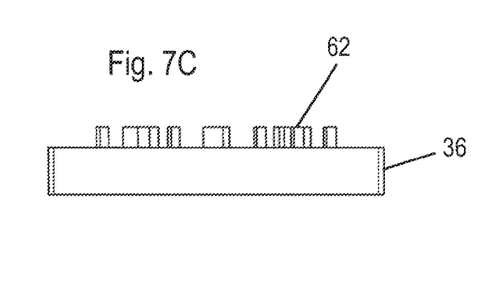
FIG. 7C is a plan view illustrating the side of the second lower grinding plate.
Figure 7D:
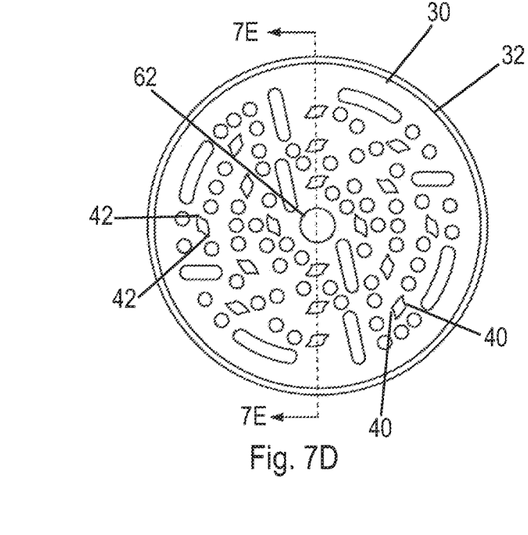
FIG. 7D illustrates the top side of the second lower grinding plate.
Figure 7E:
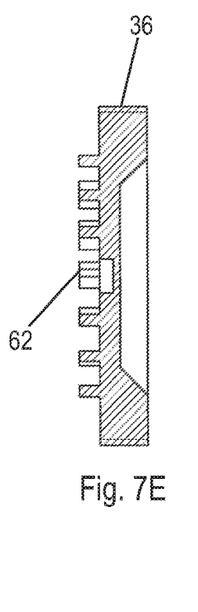
FIG. 7E is a section view taken along lines 7E-7E of FIG. 7D.
Figure 8A:
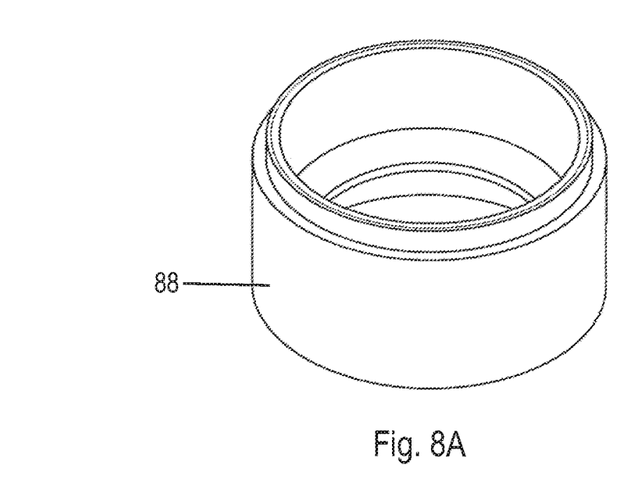
FIG. 8A is an isometric view illustrating the sieve section of the embodiment illustrated in FIG. 1.
Figure 8B:
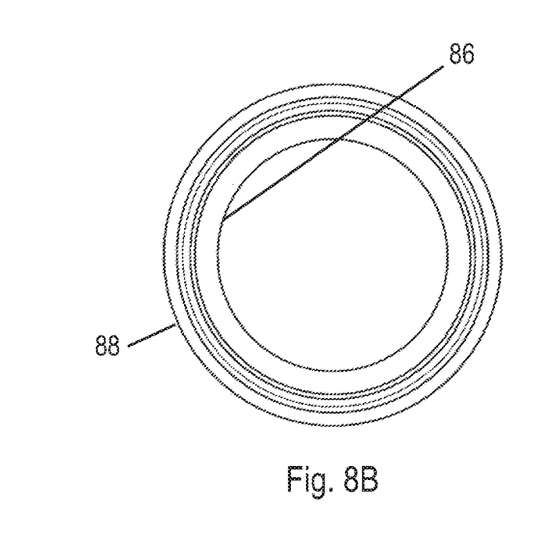
FIG. 8B is a plan view illustrating the bottom side of the sieve section.
Figure 8C:
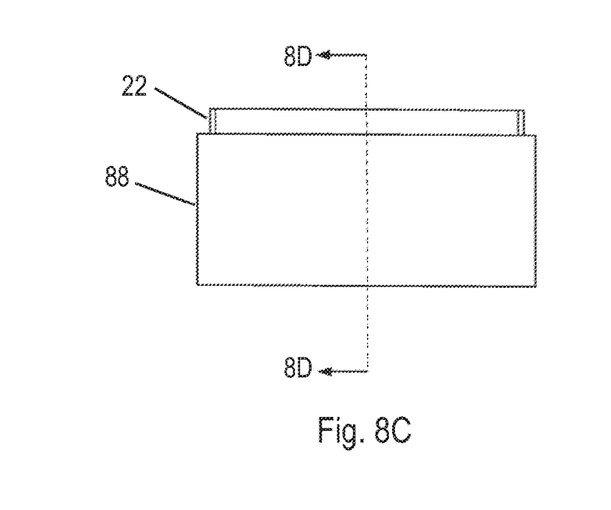
FIG. 8C is a plan view illustrating the side of the sieve section.
Figure 8D:
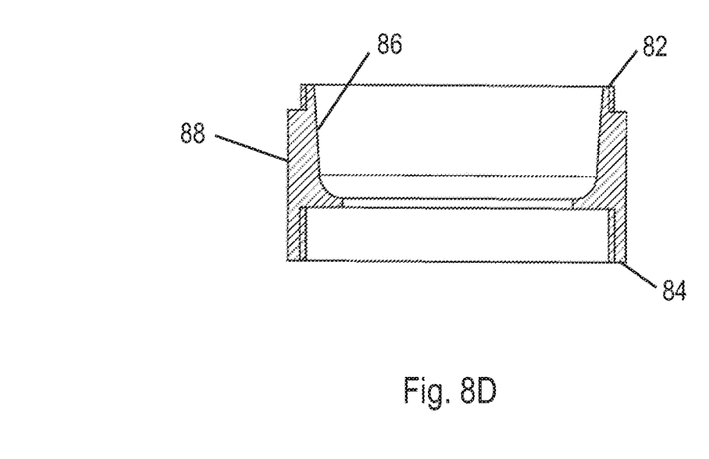
FIG. 8D is a section view taken along lines 8D-8D of FIG. 8C.
Figures 9A, 9B, 9D:
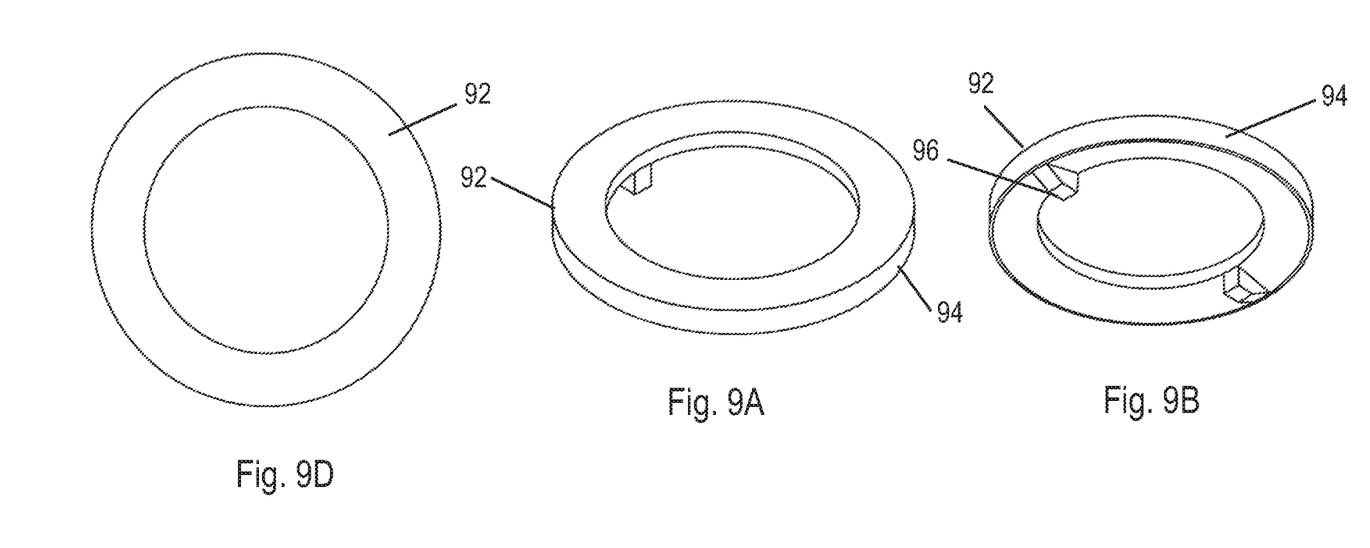
FIG. 9A is a top isometric view illustrating the screen frame of the embodiment illustrated in FIG. 1.
FIG. 9B is a bottom isometric view illustrating the screen frame of the embodiment illustrated in FIG. 1.
FIG. 9D is a plan view illustrating the top side of the screen frame section.
Figure 9C:
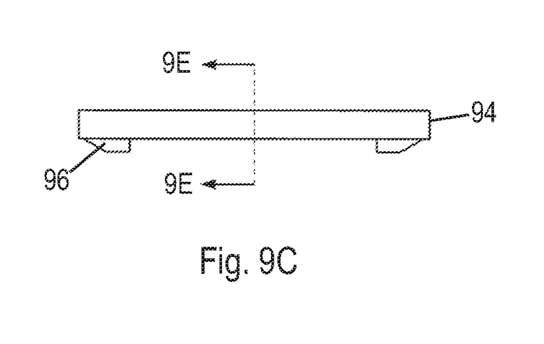
FIG. 9C is a plan view illustrating the side of the screen frame.
Figure 9E:
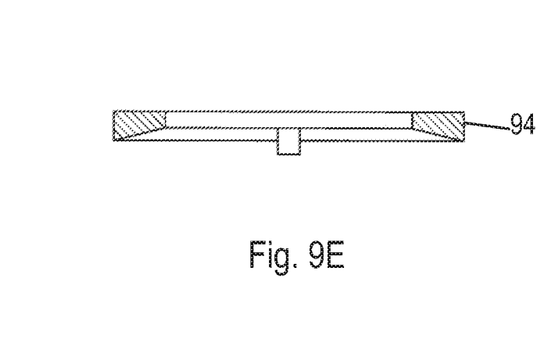
FIG. 9E is a section view taken along lines 9E-9E of FIG. 9C.
Figure 10A:
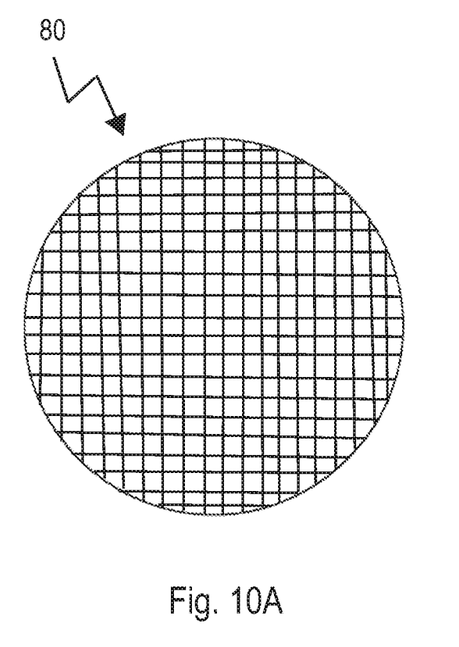
FIG. 10A is a top side view illustrating the sieve screen.
Figure 10B:
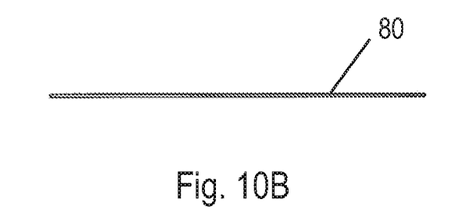
FIG. 10B is a side view of the sieve screen.
Figure 11A:
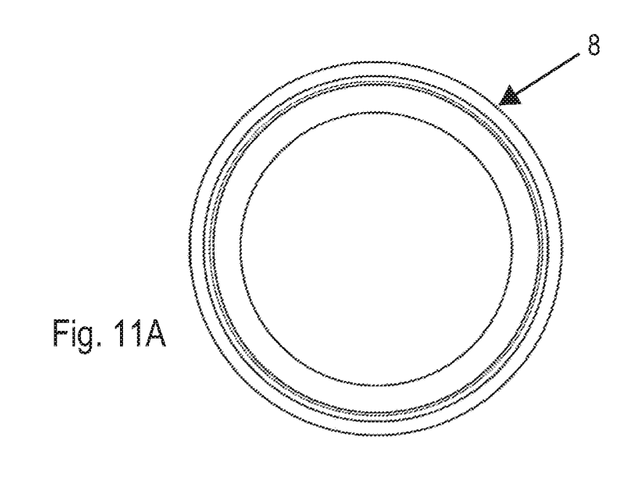
FIG. 11A is a top view of the bottom cap member as illustrated in FIG. 1.
Figure 11B:
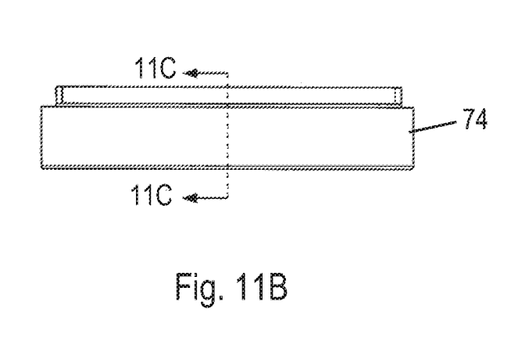
FIG. 11B is a side view of the bottom cap member.
Figure 11C:
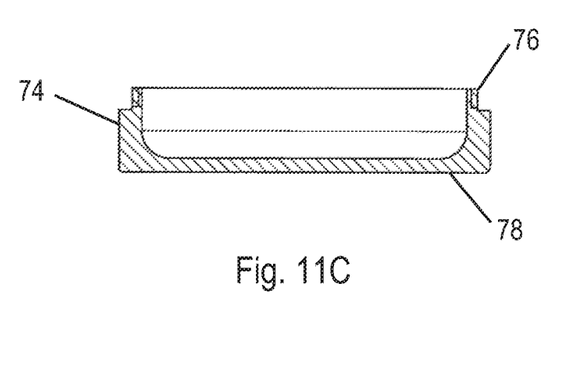
FIG. 11C is a section view taken along lines 11C-11C of FIG. 11B.

Referring to FIGS. 1-11C, an herb grinder system 100 is illustrated. The herb grinder system is useful for grinding herbs, tobacco, marijuana and the like. The preferred embodiment of the herb grinder system includes a tubular housing 2, a first lower grinding plate 4, an upper grinding plate assembly 6 and a bottom cap member 8. At least one alternative embodiment also includes a sieve section 10.

Referring to FIGS. 1, 2 and 5A-5D, the tubular housing 2 is generally a tubular member including an internal bore 12, an outer surface 14, a top surface 16 and a lower surface 18. The lower portion of the internal bore 12 has internal engaging structures, illustrated herein as helical threads 22, for attachment of a first lower grinding plate 4 as well as the bottom cap member 8, or alternatively the sieve section 10, each having conjugate external engaging structures. This construction permits the assembly of multiple embodiments utilizing the various component parts and assemblies. It should be noted that, while the internal engaging structures are illustrated herein as threads, other engaging structures such as bayonet mounts, multi lead threads, quick releases and the like may be utilized without departing from the scope of the invention. In a most preferred embodiment, the internal bore 12 of the tubular housing member includes a shoulder surface 24 therein; the shoulder surface is positioned above the internal engaging structures to provide a surface against which a portion of the upper surface 32 of the first grinding plate 4 abuts when secured within the internal bore. This construction provides support to the lower grinding plate 4 from the outer perimeter surface 36 as well as from the upper surface 32 to prevent unwanted rotation of the lower grinding plate, and insures that the grinding plate is secured perpendicularly within the bore. The construction also prevents finely ground particles from being trapped between the outer perimeter surface of the grinding plate and the bore wall 12. The top portion 26 of the internal bore 12 is preferably provided with a smooth surface for cooperation with the upper grinding plate assembly 6. Some embodiments may include deflectors 28 for deflecting the material being ground back into the central portion of the grinder.

Referring to FIGS. 1, 2, 6A-6E, and 7A-7E, the first lower grinding plate 4 and second lower grinding plate 64 are illustrated. The first and second lower grinding plates 4, 64 include a plate portion 30 having an upper surface 32, a lower surface 34 and an outer perimeter surface 36. The outer perimeter surface 36 has conjugate engaging structures, illustrated herein as helical threads 22, for cooperation with said internal engaging structures 22 to secure the first or second lower grinding plate at a substantially perpendicular orientation with respect to the internal bore 12 at a position below the top surface 16 of the tubular housing member (FIG. 5) and to prevent unwanted rotation thereof. The upper surface 32 of the first and second lower grinding plates 4, 64 each have a plurality of upstanding blades 38 integrally formed to the plate. In a most preferred embodiment, each blade 38 includes a modified diamond pattern when viewed from the top, whereby at least two side surfaces 40 of each modified diamond include at least one concave radius. The concave radius 41 is positioned along the side surfaces to cause each distal point 42 of each blade to be a concave beveled cutting edge. A plurality of sized apertures 44 are positioned proximate to the blades and extending through the plate for controlling the grind size that is allowed to pass through the plate. In at least one embodiment, the apertures include more than one size to allow different sized grinds to pass through the plate. In a most preferred embodiment, the apertures in the second lower grinding plate 64 are all smaller than the apertures in the first lower grinding plate to provide a smaller ground material.

Referring to FIGS. 1, 2, 3A-3D and 4A-4D, the upper grinding plate assembly 6 is illustrated. The upper grinding plate assembly 6 includes the upper grinding plate 54 and a lid member 66. The upper grinding plate 54 includes an upper surface 46, a lower surface 48, an outer diameter surface 50 and a pilot portion 52. The pilot portion 52 is sized and shaped to fit within the internal bore 12 while allowing rotation of the upper grinding plate assembly 6 with respect to the tubular housing member 2. The lower surface 48 of the upper grinding plate assembly 6 includes a plurality of outwardly extending blades 38 positioned to pass between said upstanding blades 38 of the lower grinding plate 4 when the upper grinding plate is rotated. In a most preferred embodiment, each blade 38 includes a modified diamond pattern when viewed from the top, whereby at least two side surfaces 40 of each modified diamond include at least one concave radius 41. The concave radius is positioned along the side surfaces to cause each distal point 42 of each blade to be a concave beveled cutting edge. The pilot portion of the upper grinding plate 54 is cylindrical in shape, having an outer diameter 56 that is sized to fit within the top portion of said internal bore 12 of the tubular housing member 2. In a preferred embodiment, the outer diameter surface 56 of the pilot portion 52 includes a plurality of burnishing rings 58 separated by debris rings 60. The debris rings 60 having a smaller diameter than the burnishing rings 58. In this manner, finely ground material is prevented from binding rotation of the upper grinding assembly. The burnishing rings 58 provide precise positioning while pushing debris into the debris rings 60, which can be cleaned after the grinding is completed. In at least one embodiment, the upper grinding plate 54 includes a magnet 62 positioned in a central portion of the lower surface 48. The first lower grinding plate 4 includes a magnet 62 positioned in a central portion thereof, so that the magnets attract each other when said pilot portion 52 of the upper grinding plate assembly 6 is positioned within the top portion of the internal bore 12 of the tubular housing member 2.

The upper grinding plate assembly 6 includes a lid member 66 constructed and arranged to cooperate with an upper portion 26 of the outer diameter surface 14 of the upper grinding plate assembly 6. The lid member 66 is cup shaped including an inner wall 68, the inner wall including helical threads for cooperation with mating helical threads on the upper portion of the upper grinding plate assembly. In at least one embodiment, the threads have sufficient length to cooperate with the second lower grinding plate 64 for storage within the lid member, while the upper surface 46 of said upper grinding plate assembly is constructed to be concave to provide an upper grinding plate storage area enclosable with the lid member.

Referring to FIGS. 1, 2, and 11A-11C, a bottom cap member 8 is illustrated. The bottom cap member 8 has an outer perimeter surface 74, a top surface 76 and a bottom surface 78. The outer perimeter surface 74 has conjugate engaging structures, illustrated herein as threads, 22 for cooperation with said internal engaging structures within said tubular housing member 2 to secure said bottom cap member 8 at a substantially perpendicular orientation with respect to said internal bore 12 at a position juxtaposed to said lower surface 18 of said tubular housing member 2, having a gap or concavity between said top surface 76 of said bottom cap member 8 and said lower surface 34 of said lower grinding plate 4.

Referring to FIGS. 1, 2, 8A-8D, 9A-9E and 10A-10B, a sieve section 10 is illustrated. The sieve section 10 is insertable between the lower surface 18 of the housing member 2 and the bottom cap member 8. The sieve section 10 is constructed and arranged to separate a predetermined particle size of ground material from the remaining ground material using a screen 80. The sieve section 10 is tubular in shape having an upper surface 82, a lower surface 84, an inner bore surface 86 and an outer surface 88. A screen assembly 90 is releasably secured within the inner bore surface. The screen assembly 90 includes a screen 80 and a screen frame 92; the screen frame 92 extending around the perimeter of the screen 80 with the screen frame retaining the screen within the inner bore surface. In a preferred embodiment, the screen frame 92 includes threads on an outer diameter 94 thereof, the inner bore surface 86 of the sieve section 10 including conjugate threads for cooperation with the outer diameter of said frame. Tabs 96 are provided to allow the screen frame to be inserted and removed from the sieve section. It should be noted that the present device may be manufactured in a variety of sizes to accommodate different volumes of material to be ground. It should also be noted that the preferred material for construction of the herb grinding system is metal, and more preferably aluminum having a T6 or T7 temper. However, other material including plastic, carbon fiber or suitable combinations thereof may be utilized without departing from the scope of the invention. It should also be apparent to those skilled in the art that screens of various mesh may be utilized to separate out desirable sizes of ground material.

What is claimed:

1. An herb grinder system comprising:
a tubular housing member including a round internal bore, an outer surface, a top surface and a lower surface, a lower portion of said round internal bore having internal engaging structure for attachment of an interchangeable screen assembly, a top portion of the said internal bore having a smooth surface;
a first lower grinding plate including a plate portion having an upper surface, a lower surface, said first lower grinding plate secured at a perpendicular orientation with respect to said internal bore at a position below said upper surface of said tubular housing member and above said interchangeable screen assembly, said first lower grinding plate secured to said tubular housing member in manner that prevents unwanted rotation thereof, said upper surface of said first lower grinding plate having a plurality of upstanding blades integrally formed to said plate portion, said plate portion having a plurality of sized apertures positioned proximate to said blades and extending through said plate portion so that ground material passing through said sized apertures falls on an upper surface of said interchangeable screen assembly,
an upper grinding plate assembly, said upper grinding plate assembly including an upper surface, a lower surface, an outer diameter surface and a pilot portion, said pilot portion sized and shaped to fit within said internal bore of said tubular housing member while allowing rotation of said upper grinding plate assembly with respect to said tubular housing member, said lower surface of said upper grinding plate assembly including a plurality of outwardly extending blades positioned to pass between said upstanding blades of said lower grinding plate when said upper grinding plate is rotated, said interchangeable screen assembly releasably secured within said internal bore of said tubular housing member, said screen assembly including a screen and a screen frame, said screen frame extending around a perimeter of said screen, said screen frame round in shape having an upper surface, a lower surface, an inner bore surface and an outer surface, said inner bore surface of said screen frame retaining said screen within said inner bore surface of said screen frame, said outer surface of said screen frame including an external engaging structure that is constructed and arranged to cooperate with said internal engaging structure for retaining said screen within said inner bore surface;

a bottom cap member, said bottom cap member having an outer perimeter surface, a top surface and a bottom surface, said outer perimeter surface having conjugate engaging structures for cooperation with said internal engaging structures within said tubular housing member to secure said bottom cap member at a perpendicular orientation with respect to said internal bore at a position juxtaposed to said lower surface of said tubular housing member having a storage area between said bottom cap member and a lower surface of said interchangeable screen assembly.

2. The herb grinder system of claim 1 wherein said screen frame includes threads on an outer surface thereof, said internal bore surface of said tubular housing member including conjugate threads for cooperation with said outer surface of said frame.

3. The herb grinder system of claim 1 wherein each said blade includes a modified diamond pattern when viewed from the top, whereby at least two side surfaces of each said modified diamond include at least one concave radius, said at least one concave radius positioned to cause each distal point of each said blade to be a concave beveled cutting edge.

4. The herb grinder system of claim 1 wherein said upper grinding plate assembly includes a lid member constructed and arranged to cooperate with an upper portion of said outer diameter surface of said upper grinding plate assembly, said upper surface of said upper grinding plate assembly being concave to provide an upper grinding plate storage area enclosable with said lid member.

5. The herb grinder system of claim 2 wherein said lid member is cup shaped including a threaded inner wall, an inner lid surface.

6. The herb grinder system of claim 5 wherein said lid member threads have sufficient length to cooperate with a second lower grinding plate including a second plate portion having an upper surface, a lower surface and an outer perimeter surface, said outer perimeter surface having threads for cooperation with said lid member threads to secure said second lower grinding plate at a position adjacent said inner lid surface, said upper surface of said second lower grinding plate having a different arrangement of upstanding blades integrally formed to said plate when compared to said first lower grinding plate, said second plate portion having a plurality of sized apertures positioned proximate to said blades and extending through said plate.

7. The herb grinder system of claim 1 wherein said upper grinding plate assembly includes a magnet positioned in a central portion of said lower surface, said first lower grinding plate including a magnet positioned in a central portion thereof, so that said magnets attract each other when said pilot portion of said upper grinding plate assembly is positioned within said top portion of said internal bore of said tubular housing member.

8. The herb grinder system of claim 7 wherein said second lower grinding plate includes a magnet positioned in a central portion thereof.

9. The herb grinder system of claim 1 wherein said internal bore of said tubular housing member includes a shoulder therein, said shoulder positioned above said internal engaging structures to provide a surface against which a portion of said upper surface of said first grinding plate abuts when secured within said internal bore.

10. An herb grinder system comprising:
a tubular housing member including an internal bore, an outer surface, a top surface and a lower surface, a top portion of the said internal bore having a smooth surface, a lower portion of said internal bore having internal engaging structure;
a first lower grinding plate including a plate portion having an upper surface with upstanding blades integrally formed to said first lower grinding plate, at least a portion of an outer diameter having an external engaging structure for securing said first lower grinding plate perpendicular to said internal bore;
an interchangeable screen assembly, said interchangeable screen assembly including a screen and a screen frame, said screen frame extending around a perimeter of said screen with the screen frame retaining said screen within an inner bore surface of said screen frame with said screen frame securing said interchangeable screen assembly within said tubular housing internal bore, said screen extending across said screen frame inner bore, said screen frame internal bore being smaller in diameter than said tubular housing inner bore, said screen frame including said external engaging structure on an outer surface of said screen frame that is constructed and arranged to cooperate with said internal engaging structure for securing said interchangeable screen assembly spaced apart and parallel to said first lower grinding plate;
a bottom cap member enclosing said internal bore of said tubular housing member; and
an upper grinding plate assembly, said upper grinding plate assembly including a pilot portion sized and shaped to fit within said internal bore of said tubular housing member while allowing rotation of said upper grinding plate assembly with respect to said tubular housing member, a lower surface of said upper grinding plate assembly including a plurality of outwardly extending blades positioned to pass between said upstanding blades of said lower grinding plate when said upper grinding plate is rotated.

* * * * *